United States Patent
Chang et al.

(10) Patent No.: US 12,213,206 B2
(45) Date of Patent: Jan. 28, 2025

(54) DRX CYCLE RECONFIGURATION TO IMPROVE DETECTION OF D2D TRANSMISSIONS

(71) Applicant: Kyocera Corporation, Kyoto (JP)

(72) Inventors: Henry Chang, San Diego, CA (US); Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 343 days.

(21) Appl. No.: 17/790,918

(22) PCT Filed: Jan. 15, 2021

(86) PCT No.: PCT/US2021/013549
§ 371 (c)(1),
(2) Date: Jul. 5, 2022

(87) PCT Pub. No.: WO2021/146502
PCT Pub. Date: Jul. 22, 2021

(65) Prior Publication Data
US 2023/0007726 A1 Jan. 5, 2023

Related U.S. Application Data (60) Provisional application No. 62/961,831, filed on Jan. 16, 2020, provisional application No. 62/961,825, filed on Jan. 16, 2020.

(51) Int. Cl.
*H04W 76/28* (2018.01)
*G08G 1/16* (2006.01)
(Continued)

(52) U.S. Cl.
CPC ....... *H04W 76/28* (2018.02); *H04W 52/0216* (2013.01); *H04W 72/20* (2023.01);
(Continued)

(58) Field of Classification Search
CPC . H04W 76/28; H04W 52/0216; H04W 72/20; H04W 74/085; H04W 76/14;
(Continued)

(56) References Cited

U.S. PATENT DOCUMENTS 9,736,847 B2 8/2017 Feng et al.
10,129,842 B2 11/2018 Jeong et al.
(Continued)

FOREIGN PATENT DOCUMENTS

WO 2015-176251 A1 11/2015

*Primary Examiner* — Ayanah S George (57) ABSTRACT

The methods, devices, and systems discussed herein involve a mobile wireless communication device (WCD) receiving a first discontinuous reception (DRX) cycle configuration from a network. In some examples, the first DRX cycle configuration is a UE-specific DRX cycle configuration. In other examples, the first DRX cycle configuration is a default DRX cycle configuration. The WCD also receives a second DRX cycle configuration that is different from the first DRX cycle configuration from the network. In some examples, the second DRX cycle configuration is compatible with a sidelink DRX cycle configuration of a D2D-capable device. Upon entering a first area that is near a potential safety scenario, such as an intersection, the WCD receives a signal containing an indicator. In response to receiving the signal, the WCD utilizes the second DRX cycle configuration to detect one or more device-to-device (D2D) transmissions from a D2D-capable device.

20 Claims, 5 Drawing Sheets

(51) Int. Cl.
*H04W 52/02* (2009.01)
*H04W 72/20* (2023.01)
*H04W 74/0833* (2024.01)
*H04W 76/14* (2018.01)

(52) U.S. Cl.
CPC ......... *H04W 74/085* (2013.01); *H04W 76/14* (2018.02); *G08G 1/166* (2013.01)

(58) Field of Classification Search
CPC ... H04W 4/021; H04W 4/90; H04W 52/0229; H04W 92/18; G08G 1/166; G08G 1/164; Y02D 30/70
See application file for complete search history.

(56) References Cited

U.S. PATENT DOCUMENTS

| | | | |
|---|---|---|---|
| 10,172,107 B2 | 1/2019 | Yang et al. | |
| 10,349,352 B2 | 7/2019 | Song et al. | |
| 2017/0188411 A1* | 6/2017 | Siomina | H04W 52/0216 |
| 2017/0325164 A1* | 11/2017 | Lee | H04W 72/23 |
| 2020/0084642 A1* | 3/2020 | Siomina | H04W 56/001 |

* cited by examiner

DRX CYCLE RECONFIGURATION TO IMPROVE DETECTION OF D2D TRANSMISSIONS

CLAIM OF PRIORITY

The present application claims the benefit of priority to Provisional Application No. 62/961,831, entitled "Local Broadcast for Vulnerable Road User Safety", and to Provisional Application No. 62/961,825, entitled "Local Broadcast for Vulnerable Road User Safety", both filed Jan. 16, 2020, assigned to the assignee hereof, and hereby expressly incorporated by reference in their entirety.

FIELD

This invention generally relates to wireless communications and more particularly to local broadcasts of a signal containing an indicator.

BACKGROUND

There is a benefit when information is provided to vulnerable road users (e.g., pedestrians or cyclists) regarding the presence of moving vehicles. More specifically, providing warnings to vulnerable road users may advantageously prevent collisions with moving vehicles.

SUMMARY

The methods, devices, and systems discussed herein involve a mobile wireless communication device (WCD) receiving a first discontinuous reception (DRX) cycle configuration from a network. In some examples, the first DRX cycle configuration is a UE-specific DRX cycle configuration. In other examples, the first DRX cycle configuration is a default DRX cycle configuration. The WCD also receives a second DRX cycle configuration that is different from the first DRX cycle configuration from the network. In some examples, the second DRX cycle configuration is compatible with a sidelink DRX cycle configuration of a D2D-capable device. Upon entering a first area that is near a potential safety scenario, such as an intersection, the WCD receives a signal containing an indicator. In response to receiving the signal, the WCD utilizes the second DRX cycle configuration to detect one or more device-to-device (D2D) transmissions from a D2D-capable device.

DETAILED DESCRIPTION

The examples described herein are generally directed to providing warnings to vulnerable road users (e.g., pedestrians or cyclists) regarding the presence of moving objects (e.g., vehicles, drones, robots, etc.). These warnings may advantageously prevent collisions between the vulnerable road users and the moving objects.

For example, consider the scenario in which a pedestrian is about to cross a street by using a crosswalk at an intersection and an approaching vehicle is about to pass through the same crosswalk. In this situation, a vehicle user equipment device (VUE) located within the vehicle transmits a warning message using device-to-device (D2D) communication resources. The pedestrian user equipment device (PUE) receives the warning message, if the PUE is monitoring all available D2D communication resources. Although effective, this method is inefficient, from a battery-consumption point of view, since the PUE must constantly remain powered on and active to monitor all of the available D2D communication resources.

In order to save battery power, the PUE can be configured to (1) perform periodic monitoring of selected D2D communication resources (e.g., partial sensing method), and (2) go to sleep in between the sensing durations (e.g., periods). The VUEs are configured to transmit their warning messages using only the selected D2D communication resources that are being periodically monitored by the PUE. Although the PUE monitors a smaller subset of D2D communication resources, this method still does not significantly reduce the power consumption required by the PUE to monitor the D2D communication resources. More specifically, the PUE must periodically wake-up from its sleep state, resynchronize, and then detect the VUE's warning messages. Besides the inefficient battery consumption, this method is also not suitable in situations when latency is critical. For example, the periodicity of the selected D2D communication resources could be too long for many collision-avoidance scenarios.

As an alternative to the VUEs transmitting warning messages, the PUEs could broadcast warning messages using the first available D2D communication resource. Since the VUEs have no battery consumption constraint, they can continuously monitor all of the D2D communication resources. For example, a PUE would transmit a warning message when it gets close to a potentially hazardous situation (e.g., before reaching a street crossing). This warning message would provide safety-related information such as the PUE's location and heading. Once the PUE is no longer in or near a potentially hazardous situation (e.g., the pedestrian is done crossing the street), the PUE stops transmitting the warning message. However, this method would require the PUE to be constantly aware of its geo-location, which would require the PUE's power-consuming, global positioning system (GPS) receiver or other geo-location determination hardware to stay active.

Instead of the PUE determining its geo-location, an improvement to the above method is for the network to send a warning message to the PUE using the cellular link (Uu-link), which would trigger the PUE to transmit a location/heading safety message over D2D communication resources. For example, if a road sensor (e.g., camera, radar, etc.) detects a pedestrian, the road sensor notifies the cellular network. After receiving the notification, a gNB (e.g., base station) of the cellular network broadcasts a paging or notification message to an area in which the PUE is located. In other examples, the gNB transmits the paging or notification message to one or more PUEs via a unicast or multicast transmission. Regardless of how the paging or notification message is transmitted, the paging or notification message contains an indicator, which instructs the PUE to activate a collision-avoidance procedure. In some examples, the collision-avoidance procedure includes transmitting a D2D location/heading safety message.

The near-by VUEs receive this safety message and take the appropriate steps to avoid collision. Although this method reduces the PUE's battery-consumption, the method has a large delay due to the road sensor detection processing, road sensor accessing the network, network processing, and the network paging the PUE. Moreover, the network must wait to page the PUE when the PUE wakes up from its sleep cycle. In some examples, all of these added delays are unacceptable, especially for safety-related applications. Therefore, there is a need to reduce this delay.

Some of the examples described herein are configured to operate in conjunction with the IDLE state procedure of the 3rd Generation Partnership Project 5G New Radio (3GPP 5G NR) communication specification. As part of the 3GPP 5G NR IDLE state procedure, a user equipment device (UE) sleeps for a time-period to reduce battery consumption and periodically wakes up to receive a paging message. If the UE does not receive a paging message, the UE goes back to sleep until the next wake up time. This sleep cycle is also known as discontinuous reception (DRX).

The basic mechanism for DRX is a configurable DRX cycle in the UE. A DRX cycle configuration consists of many parameters, such a DRX period, on-duration, DRX inactivity timer, DRX retransmission timer, etc. With a DRX cycle configured, the UE monitors the downlink control signaling only when active, sleeping with the receiver circuitry switched off (e.g., in an IDLE state) when not active. This allows for a significant reduction in power consumption: the longer the cycle, the lower the power consumption.

Naturally, this implies restrictions to the scheduler as the UE can be addressed only when active, according to the DRX cycle. Thus, a (long) DRX cycle in combination with the UE remaining awake for some period after being scheduled is sufficient for most scenarios. However, some services, most notably Voice over Internet Protocol (VoIP), are characterized by periods of regular transmission, followed by periods of no or very little activity.

To handle these services, a short DRX cycle can optionally be used in addition to the long cycle described above. Normally, the UE follows the long DRX cycle, but if it has recently been scheduled, the UE will follow a shorter DRX cycle for some time. Handling VoIP in this scenario can be done by setting the short DRX cycle to 20 ms, as the voice codec typically delivers a VoIP packet once every 20 ms. The long DRX cycle is then used to handle longer periods of silence when the UE is not receiving VoIP packets.

Upon waking from an IDLE state (e.g., sleep state), the UE attempts to detect the last serving cell's Synchronization Signal Block (SSB) to receive the paging message. In the context of 3GPP 5G NR, the SSB is comprised of a primary synchronization signal (PSS), a secondary synchronization signal (SSS), and a downlink physical broadcast channel (PBCH). The PSS and SSS are a pair of downlink signals that are used by UEs to find, identify, and synchronize to a network. The PBCH is transmitted together with the PSS/SSS and carries a minimum amount of system information including an indication where the remaining broadcast system information is transmitted. The PSS, SSS, and PBCH are jointly referred to as the SSB.

Besides attempting to detect the last serving cell's SSB upon waking, the UE may also attempt to detect one or more neighboring cell's SSBs, as well. If successfully detected, the UE adds the detected SSBs of the neighboring cells to a list of candidate cells. The UE maintains the list of candidate cells in order to perform a handover to another cell when the downlink signal of one of the candidate cells has a stronger received signal strength than the downlink signal of the serving cell. Since the UE may have performed a reselection to another cell, the network is not aware of the exact cell the UE is camping on during its IDLE state. Thus, when the network needs to page a UE, the network will send the page to a group of cells in case the UE has performed a handover to a neighboring cell during the IDLE state of the UE.

The methods, devices, and systems discussed herein involve a mobile wireless communication device, such as a PUE, receiving a first DRX cycle configuration from a network. The PUE also receives a second DRX cycle configuration that is different from the first DRX cycle configuration from the network. In some examples, the second DRX cycle configuration is compatible with a sidelink DRX cycle configuration of a D2D-capable device. Upon entering a first area that is near a potential safety scenario, such as an intersection, the PUE receives a signal containing an indicator. In response to receiving the signal, the PUE utilizes the second DRX cycle configuration to detect one or more device-to-device (D2D) transmissions from a D2D-capable device.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

Figure 1A:
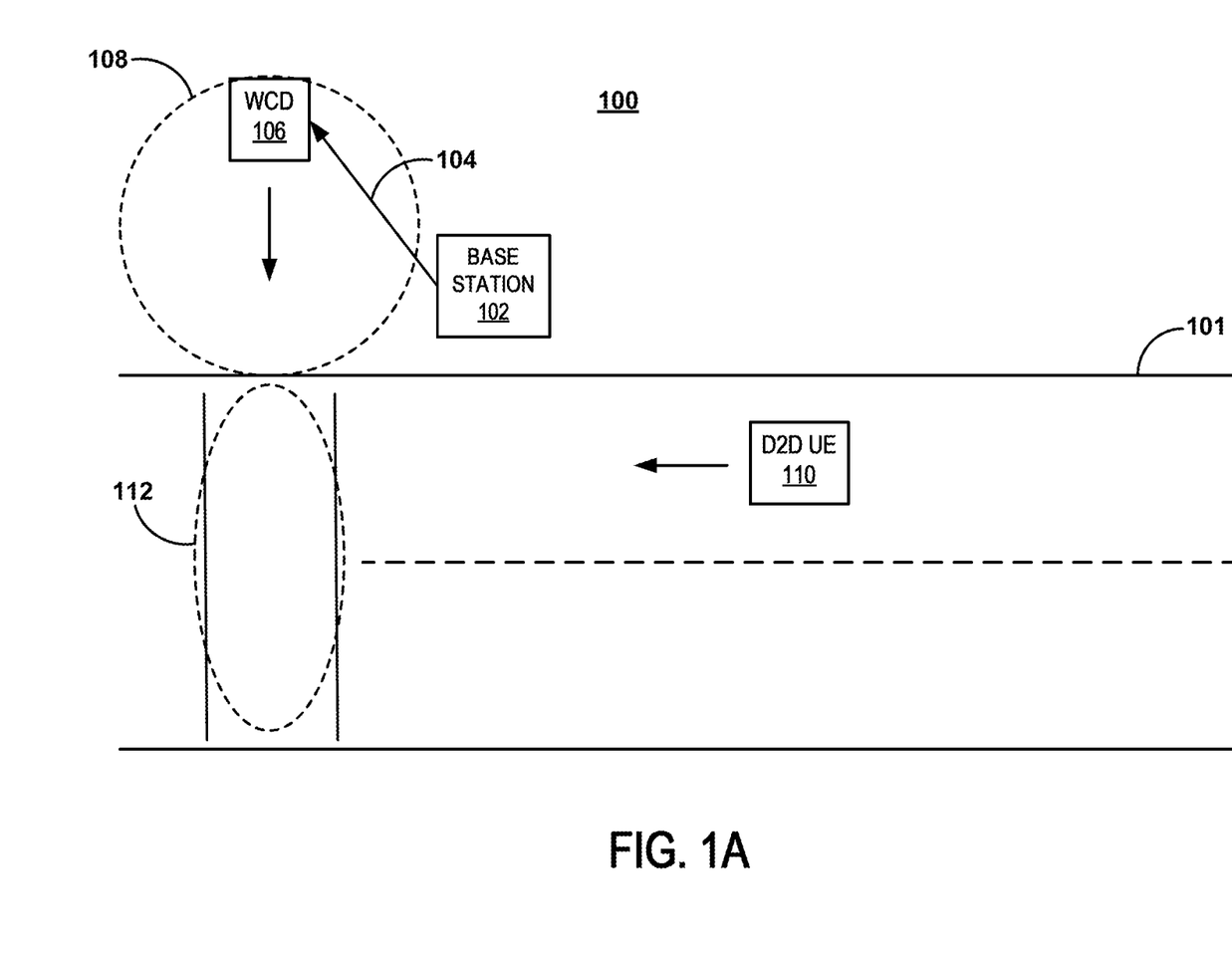
FIG. 1A is a block diagram of an example of a system in which a mobile wireless communication device receives, upon entering a first area, a signal containing an indicator and, in response, obtains and utilizes a second discontinuous reception (DRX) cycle configuration, which is different than a first DRX cycle configuration, to detect one or more device-to-device (D2D) transmissions from a D2D-capable device.

FIG. 1A is a block diagram of an example of system 100 in which a mobile wireless communication device receives, upon entering a first area, a signal containing an indicator and, in response, obtains a second discontinuous reception (DRX) cycle configuration from the network, which is different than a first DRX cycle configuration, and utilizes the second DRX cycle configuration to detect one or more device-to-device (D2D) transmissions from a D2D-capable device. Alternatively, the mobile wireless communication device could receive and store the second DRX cycle configuration prior to entering an IDLE state, and in response to receiving the signal containing the indicator, the mobile wireless communication device would initiate a procedure to utilize the previously received second DRX cycle configuration, which is different than the first DRX cycle configuration, to detect one or more device-to-device (D2D) transmissions from a D2D-capable device.

For the examples described herein, the first DRX cycle configuration may be a UE-specific DRX cycle configuration, which is configured by the upper layer of the mobile wireless communication device, or a default DRX cycle configuration configured by a System Information Block (SIB) message received from the network (e.g., from a base station). If a UE-specific DRX cycle configuration is not configured by the network, the mobile wireless communication device may utilize the default DRX cycle configuration, which is applicable to all mobile wireless communication devices that receive the default DRX cycle configuration in the SIB message.

For the example of FIG. 1A, base station 102 is located near roadway 101. Base station 102, also referred to as a gNB, operates in accordance with at least one revision of the 3rd Generation Partnership Project 5G New Radio (3GPP 5G NR) communication specification. In other examples, base station 102 may operate in accordance with other communication specifications. In still further examples, a local remote radio head (RRH), a UE-type or gNB-type road side unit (RSU), a D2D-capable device, or any other suitable device can be used in place of base station 102 to perform the functions described herein.

In the interest of brevity, FIG. 1A only depicts one base station and one WCD. However, any number of base stations may be utilized to accommodate the safety requirements of a particular area. Likewise, any number of WCDs may be serviced by the base stations.

Figure 2A:
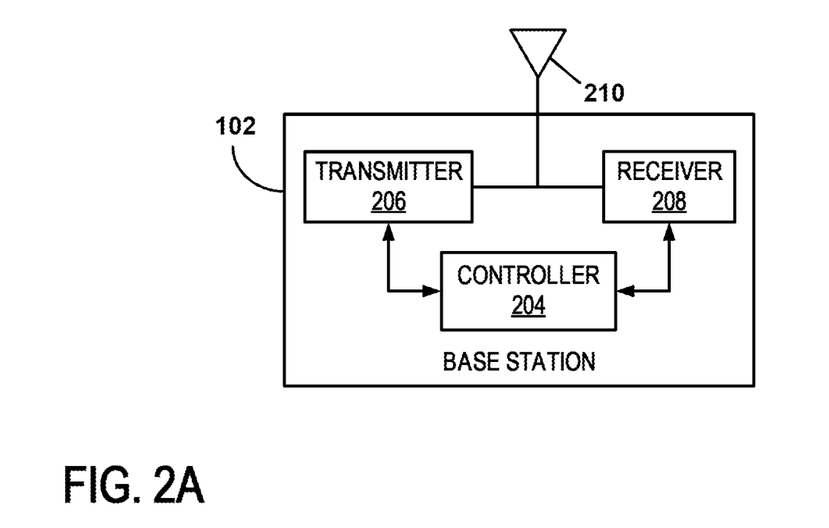
FIG. 2A is a block diagram of an example of the base station shown in FIG. 1A.

As shown in FIG. 2A, base station 102 comprises controller 204, transmitter 206, and receiver 208, as well as other electronics, hardware, and software code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Base station 102 may also include detection equipment such as a camera, radar, lidar, and/or an infra-red heat sensor. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes software code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of a downlink signal and can apply any one of a plurality of modulation orders. The demodulator demodulates any uplink signals received at base station 102 in accordance with one of a plurality of modulation orders.

Figure 2B:
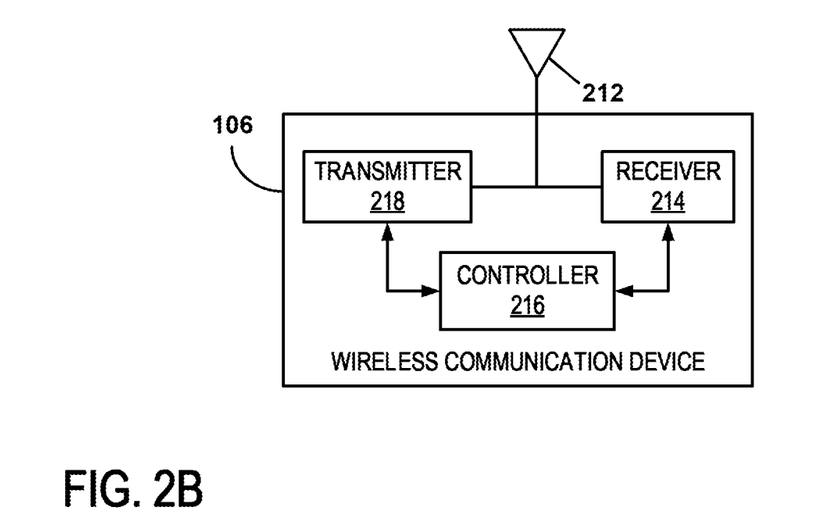
FIG. 2B is a block diagram of an example of the mobile wireless communication device shown in FIG. 1A.

As shown in FIG. 2B, mobile wireless communication device (WCD) 106 comprises controller 216, transmitter 218, and receiver 214, as well as other electronics, hardware, and software code. WCD 106 may also be referred to herein as a PUE or simply as a user equipment device (UE). WCD 106 is wirelessly connected to a radio access network (not shown) via one or more base stations (not shown), which provide various wireless services to WCD 106. For the example shown in FIG. 1A, WCD 106 operates in accordance with at least one revision of the 3rd Generation Partnership Project 5G New Radio (3GPP 5G NR) communication specification. In other examples, WCD 106 may operate in accordance with other communication specifications.

WCD 106 is any fixed, mobile, or portable equipment that performs the functions described herein. The various functions and operations of the blocks described with reference to WCD 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes software code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals.

In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

For the example of FIG. 1A, WCD 106 receives, via antenna 212 and receiver 214, a first discontinuous reception (DRX) cycle configuration from a network. As described above, the first DRX cycle configuration may be a UE-specific DRX cycle configuration or a default DRX cycle configuration. In some examples, the first DRX cycle configuration is received from base station 102. In other examples, the first DRX cycle configuration is received from a different base station (not shown).

Upon entering first area 108, WCD 106 receives, via antenna 212 and receiver 214, a signal 104, which contains an indicator. In some examples, the indicator indicates that WCD 106 is near a potential safety scenario. In other examples, the indicator indicates that WCD 106 should activate a collision-avoidance procedure. In further examples, the indicator indicates that WCD 106 should obtain and use the second DRX cycle configuration.

In some examples, base station 102 can change the periodicity of broadcast transmissions, based on the DRX cycle configuration of a group of WCDs. For example, if one group of WCDs wake at time t1 and another group of WCDs wake up at time t2, base station 102 can selectively broadcast signals 104 that correspond with time t1 for the first group of WCDs, with time t2 for the second group of WCDs, or both. In other examples, signal 104 is scheduled for broadcast transmission based on the DRX cycle configuration of a particular WCD 106 since base station 102 is aware of when WCD 106 will wake from the IDLE state.

In the example shown in FIG. 1A, base station 102 transmits, via cellular communication resources, signal 104 within first area 108. In some examples, signal 104 is part of a Synchronization Signal Block (SSB) comprising one or more broadcast signals. In other examples, signal 104 is a System Information Block (SIB) message.

In the examples in which signal 104 is part of an SSB, the indicator may be contained within a synchronization signal of the SSB. For example, a specific sequence with a specific offset for the primary synchronization signal (PSS) and/or the secondary synchronization signal (SSS) of the SSB could be transmitted as the indicator, in some examples. In other examples, the indicator may be contained within a physical broadcast channel (PBCH) transmission of the SSB. In these examples, the indicator could be transmitted within a specific field carried in the master information block (MIB) of the PBCH.

In examples in which signal 104 is a SIB message, the indicator may be contained in a System Information Block Type 1 (SIB1) message. The SIB1 message carries the remaining minimum system information that was not transmitted in the PBCH. In some examples, the SIB1 message is periodically broadcasted with a periodicity of 160 ms. However, a periodicity of 160 ms may cause excessive latency for some safety messaging applications. Thus, the periodicity of the SIB1 messaging may be reduced below 160 ms, in some examples.

In other examples in which signal 104 is a SIB message, the indicator may be contained in a SIB message other than a SIB1 message. In some examples, a SIB1 message directs WCD 106 to a subsequent SIB message that contains the indicator. In further examples, the SIB message containing the indicator is either broadcasted periodically or when requested by WCD 106.

In some examples, signal 104 is transmitted within a beam directed to first area 108. One example of such a localized transmission would be a 5G NR beam-centric transmission to first area 108. In other examples, other beamforming techniques may be used to localize transmission of signal 104 within first area 108. In further examples, signal 104 may be transmitted as a localized broadcast to first area 108.

In other examples in which a device other than base station 102 is transmitting signal 104, signal 104 may transmitted by any other suitable wireless communication protocol. Examples of other suitable wireless communication protocols include, but are not limited to, D2D communication resources, Institute of Electrical and Electronics Engineers (IEEE) 802.11 (Wi-Fi), etc. In other examples, signal 104 may be transmitted from one or more of the following: a base station, a local remote radio head (RRH), a UE-type or gNB-type road side unit (RSU), a D2D-capable device, or any other suitable device.

As used herein, first area 108 is an area that is at least near a potential safety scenario (e.g., an intersection, a crosswalk, or any other location in which a vulnerable road user may experience a collision with a moving object that is using a roadway). Second area 112 is an area that at least partially overlaps with the potential safety scenario, itself. First area 108 and second area 112 may have any suitable size, shape, and location. Moreover, in some examples, first area 108 may overlap, at least partially, with the potential safety scenario and/or second area 112. As shown in the example of FIG. 1A, first area 108 is an area near a potential safety scenario (e.g., a crosswalk), and second area 112 is an area that overlaps with the potential safety scenario, itself. For the example shown in FIG. 1A, WCD 106 enters first area 108 and is moving towards second area 112, which is a potential safety scenario.

Upon entering first area 108, WCD 106 receives signal 104, which contains an indicator, from base station 102. Upon receiving signal 104, WCD 106 initiates a connection establishment procedure with a base station (e.g., base station 102 or another base station). For example, the connection establishment procedure would involve WCD 106 transmitting, via transmitter 218 and antenna 212, a Radio Resource Control (RRC) Connection Request Message, which includes a cause value (e.g., monitor safety message or D2D transmissions) that indicates to the network the cause of the establishment request. In response to the RRC Connection Request Message, the network (e.g., base station) would transmit, via a dedicated message, an RRC Reconfiguration Request Message containing a second DRX cycle configuration to WCD 106. As used herein, dedicated messaging refers to a UE-specific message directed to a particular WCD or to a Radio Resource Control (RRC) message. Of course, any other suitable dedicated message may be used in other examples.

As mentioned above, the second DRX cycle configuration is different from the first DRX cycle configuration. In some examples, the second DRX cycle configuration is received from base station 102. In other examples, the second DRX cycle configuration is received from a different base station (not shown).

As an alternative to the example of FIG. 1A, WCD 106 could receive and store the second DRX cycle configuration prior to entering an IDLE state, and in response to receiving signal 104 containing the indicator, WCD 106 would initiate a procedure to utilize the previously received second DRX cycle configuration, which is different than the first DRX cycle configuration, to detect one or more device-to-device (D2D) transmissions from a D2D-capable device. In some examples, upon detecting signal 104, WCD 106 initiates a Random-Access Channel (RACH) procedure, whereby WCD 106 indicates in Msg 1 (e.g., a RACH Preamble message) or Msg 3 (e.g., an RRC Connection Request message) that WCD 106 plans to switch to using the stored, second DRX cycle configuration. Base station 102 responds in Msg 4 (e.g., RRC Connection Setup message) to indicate whether the request from WCD 106 to use the second DRX cycle configuration is accepted. If the request is accepted, WCD 106 begins using the second DRX cycle configuration and returns to an IDLE state. Note, in this example, WCD 106 does not enter the connected mode since the RACH procedure would not be completed.

Regardless of whether the second DRX cycle configuration is obtained after WCD 106 enters first area 108 or is preconfigured before WCD 106 enters an IDLE state, there are various considerations when determining the second DRX cycle configuration. For example, it is advantageous to utilize a second DRX cycle configuration that allows for WCD 106 to detect D2D transmissions from VUEs (e.g., D2D-capable device 110). Thus, the second DRX cycle configuration should be one in which WCD 106 is awake and ready to receive D2D transmissions at the same time as the VUEs are actively transmitting the D2D transmissions.

Since VUEs use "sidelink" for their broadcast transmissions, it is advantageous to select and utilize a second DRX cycle configuration at WCD 106 that is coordinated (e.g., aligned) with the sidelink DRX cycle configuration of one or more VUEs. More specifically, if D2D-capable device 110 uses a particular sidelink DRX cycle configuration, then base station 102 can configure WCD 106 with a second DRX cycle configuration that is coordinated with the sidelink DRX cycle configuration of the D2D-capable device 110. Thus, in some examples, the second DRX cycle configuration is compatible with a sidelink DRX cycle configuration of a D2D-capable device (e.g., D2D-capable device 110). In other examples, the second DRX cycle configuration is the same as the sidelink DRX cycle configuration of a D2D-capable device. In still other examples, the second DRX cycle configuration has an on-duration time that at least partially overlaps with the on-duration time of the sidelink DRX cycle configuration of a D2D-capable device, assuming the sidelink DRX cycle configuration wake time is longer than the wake time of the second DRX cycle configuration. In other examples, if WCD 106 is capable of operating in both the cellular and the sidelink modes simultaneously, then the second DRX cycle configuration could be non-overlapping with the first DRX cycle configuration. In this case, WCD 106 would apply both the first and the second DRX cycle configurations.

In some examples, the second DRX cycle configuration is a shorter DRX cycle configuration than the first DRX cycle configuration. In further examples, the second DRX cycle configuration is selected from a plurality of user equipment (UE) specific DRX cycle configurations. In the examples in which the second DRX cycle configuration is selected from a plurality of UE-specific DRX cycle configurations, the second DRX cycle configuration may be a sidelink DRX cycle configuration.

In some examples, controller 216 of WCD 106 utilizes the second DRX cycle configuration to detect one or more device-to-device (D2D) transmissions from D2D-capable device 110. In other examples, controller 216 of WCD 106 is further configured to activate a collision-avoidance procedure that includes sensing device-to-device (D2D) resources in order to detect the D2D transmissions from D2D-capable device 110, in response to receiving signal 104 or the second DRX cycle configuration. In further examples, such as that shown in FIG. 1C, the collision-avoidance procedure includes transmitting, from WCD 106, a periodic device-to-device (D2D) safety message using D2D resources. The collision-avoidance procedure will help avoid a collision between WCD 106 and D2D-capable device 110, which is approaching WCD 106.

In this regard, the time duration between when WCD 106 enters first area 108 to the time when WCD 106 activates the collision-avoidance procedure depends upon the periodicity of the broadcast transmissions from D2D-capable device 110 and the second DRX cycle configuration of WCD 106. Thus, first area 108 should cover an area that is large enough to ensure that a WCD 106 configured with the second DRX cycle configuration will wake up to receive signal 104 and the broadcast transmissions from D2D-capable device 110 before reaching second area 112.

As used herein, a D2D-capable device is any device that is capable of D2D communication. In some examples, D2D-capable device 110 is integrated into a vehicle, drone, robot, or the like as an onboard unit (OBU). In other examples, D2D-capable device 110 may simply be a user equipment (UE) device that is located within a vehicle, drone, robot, or the like. In further examples, D2D-capable device 110 may just be a UE device. Some examples of user equipment devices include: a mobile phone, a transceiver modem, a personal digital assistant (PDA), or a tablet, for example. Any of the foregoing devices may also be referenced herein as vehicle UEs (VUEs).

In general, whether WCD 106 will stay in a CONNECTED state or transition to an IDLE state is determined by the network. In some examples, if the second DRX cycle configuration does not need to be updated (e.g., if all the VUEs, including D2D-capable device 110, use the same DRX cycle configuration) within second area 112, the network could release WCD 106 to IDLE even within second area 112. In other examples, there may be a need for the network to update the second DRX configuration dynamically, in which case WCD 106 will remain in CONNECTED.

In further examples, controller 216 of WCD 106 is further configured to prevent WCD 106 from entering an IDLE state until the D2D transmissions from D2D-capable device 110 are detected. One way in which this can be achieved is for WCD 106 to indicate to base station 102, upon receipt of signal 104, that WCD 106 is functioning as a PUE, which would prevent base station 102 from sending WCD 106 to the IDLE state. Once WCD 106 exits first area 108 and/or second area 112, WCD 106 can send an RRC message to base station 102 indicating that WCD 106 has left first area 108 and/or second area 112, which would trigger base station 102 to release WCD 106 to the IDLE state.

In still further examples, controller 216 of WCD 106 is also configured to, upon exiting at least one of first area 108 and second area 112, utilize a DRX cycle configuration that is different than the second DRX cycle configuration. In some cases, WCD 106 reverts to utilizing the first DRX cycle configuration. In other cases, WCD 106 utilizes a DRX cycle configuration that is different than either the first DRX cycle configuration or the second DRX cycle configuration.

Figure 1B:
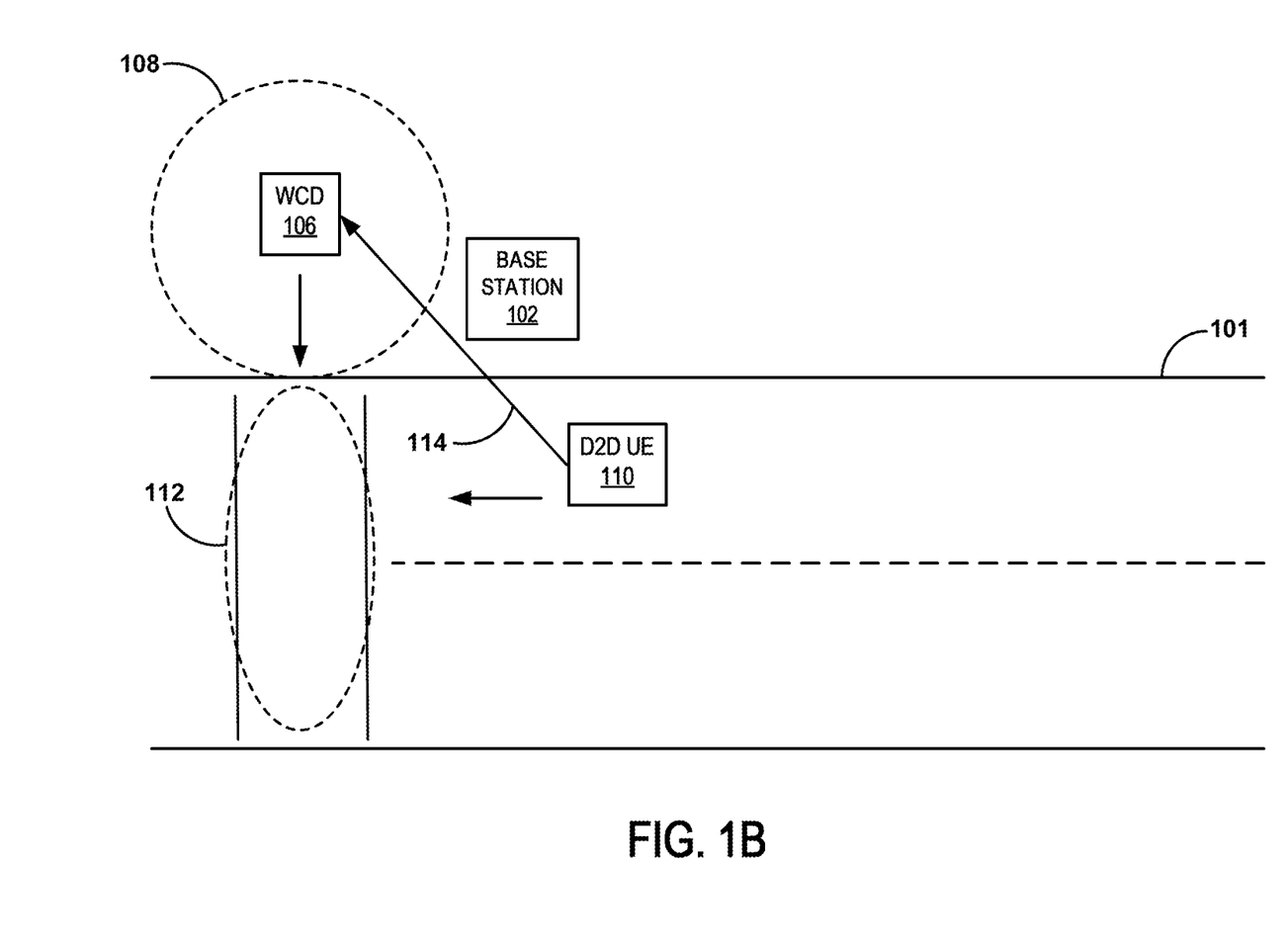
FIG. 1B is a block diagram of an example of a system in which a collision-avoidance procedure triggered in FIG. 1A includes sensing device-to-device (D2D) resources in order to detect the D2D transmissions from the D2D-capable device.

FIG. 1B is a block diagram of an example of a system in which a collision-avoidance procedure triggered in FIG. 1A includes sensing device-to-device (D2D) resources in order to detect D2D transmissions from a D2D-capable device. For example, upon entering first area 108, WCD 106 receives, via antenna 212 and receiver 214, signal 104 from base station 102. As mentioned above, signal 104 contains an indicator.

In response to receiving signal 104, WCD 106 utilizes controller 216 to activate a collision-avoidance procedure that includes sensing device-to-device (D2D) resources, using antenna 212 and receiver 214, in order to detect D2D transmissions 114 from D2D-capable device 110. As used herein, the term "sensing" includes energy-detection and/or successful decoding of the received signal's control channel. In some examples, the D2D resources that are sensed/monitored include a D2D resource pool configured for communication between D2D-capable devices and mobile WCDs. In further examples, controller 216 of WCD 106 is also configured to place the mobile WCD 106 into a sleep state after sensing the D2D resources. In still further examples, controller 216 of WCD 106 is configured to refrain from placing mobile WCD 106 into a sleep state until after there is no longer a potential for a collision (e.g., the approaching D2D-capable device 110 and/or WCD 106 have moved past the potential safety scenario, the approaching D2D-capable device 110 and/or WCD 106 have changed directions, etc.).

In some examples, the received D2D transmissions 114 include safety message information that WCD 106 can utilize to avoid a collision with a vehicle in which D2D-capable device 110 is located. Examples of safety message information include: location and heading of D2D-capable device 110, estimated time before D2D-capable device 110 enters a potential safety scenario, etc. Upon receipt of D2D transmissions 114, WCD 106 alerts a user associated with WCD 106 that there is a potential for a collision with an approaching object on roadway 101. In some examples, an application running on WCD 106 could generate an audible and/or tactile alert when WCD 106 receives a safety message from D2D-capable device 110.

Figure 1C:
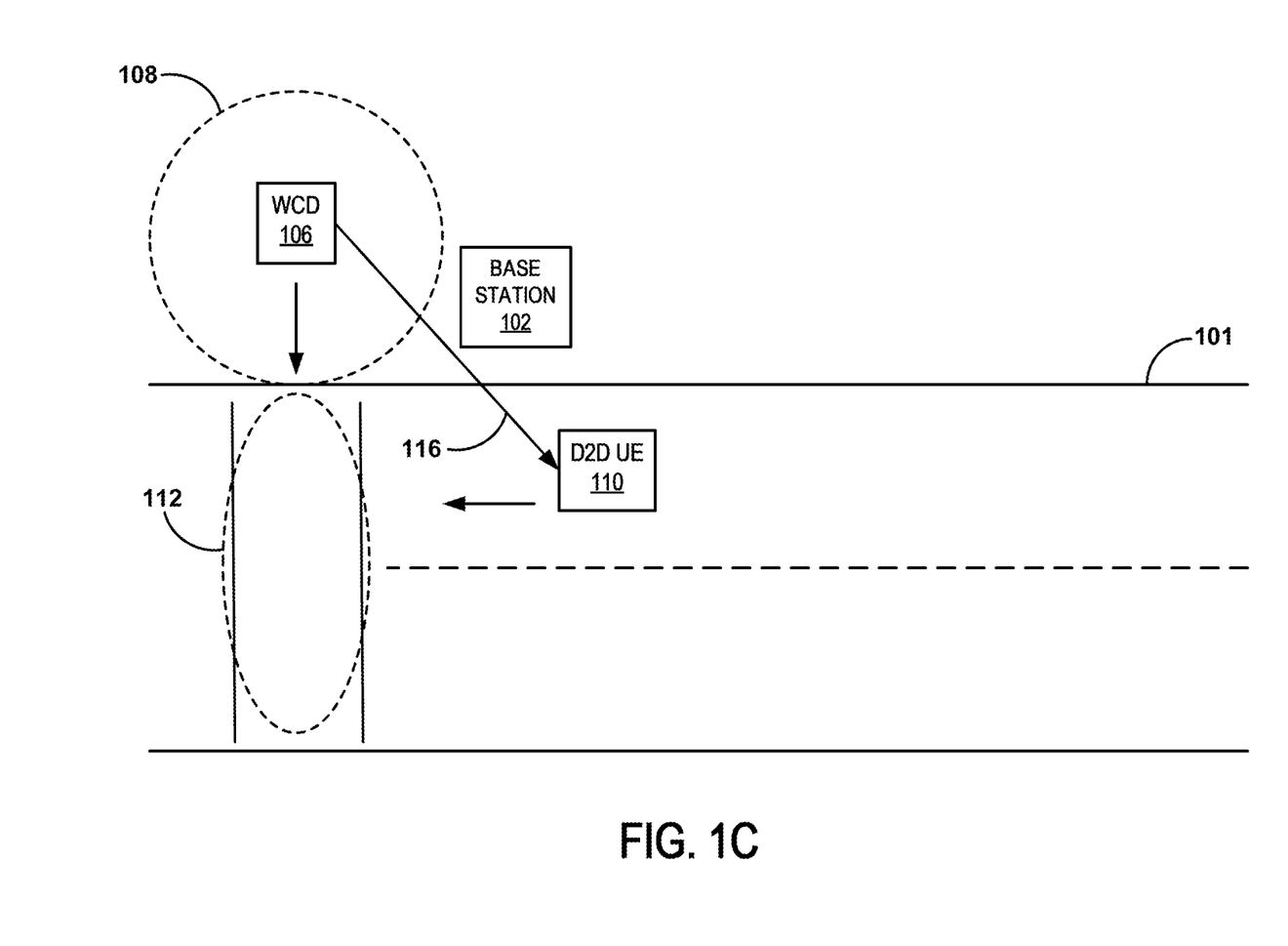
FIG. 1C is a block diagram of an example of a system in which the collision-avoidance procedure triggered in FIG. 1A includes transmitting, from the mobile wireless communication device, a periodic device-to-device (D2D) safety message using D2D resources.

FIG. 1C is a block diagram of an example of a system in which the collision-avoidance procedure triggered in FIG. 1A includes transmitting, from the mobile wireless communication device, a periodic device-to-device (D2D) safety message using D2D resources. For example, upon entering first area 108 and waking from an IDLE state, WCD 106 receives, via antenna 212 and receiver 214, signal 104 from base station 102. As mentioned above, signal 104 contains an indicator.

In response to receiving signal 104 or the second DRX cycle configuration, WCD 106 utilizes controller 216 to activate a collision-avoidance procedure that includes transmitting, via transmitter 218 and antenna 212, periodic device-to-device (D2D) safety message 116 using D2D resources. In the example shown in FIG. 1C, based on the second DRX cycle configuration, WCD 106 becomes aware of sidelink resource pool locations and broadcasts periodic D2D safety message 116 on the appropriate D2D communication resources. In some examples, periodic D2D safety message 116 includes location and heading information of the WCD 106. In other examples, periodic D2D safety message 116 may also include an estimated time when WCD 106 will enter a potential safety scenario. In further examples, transmitter 218 is configured to transmit periodic D2D safety message 116 before WCD 106 reaches second area 112. Upon receipt of periodic D2D safety message 116, D2D-capable device 110 can do one or more of the following: alert a user associated with D2D-capable device 110 that there is a potential for a collision with a vulnerable road user, and take action to prevent the collision (e.g., by braking, changing lanes, turning, etc., with or without user intervention).

Figure 3:
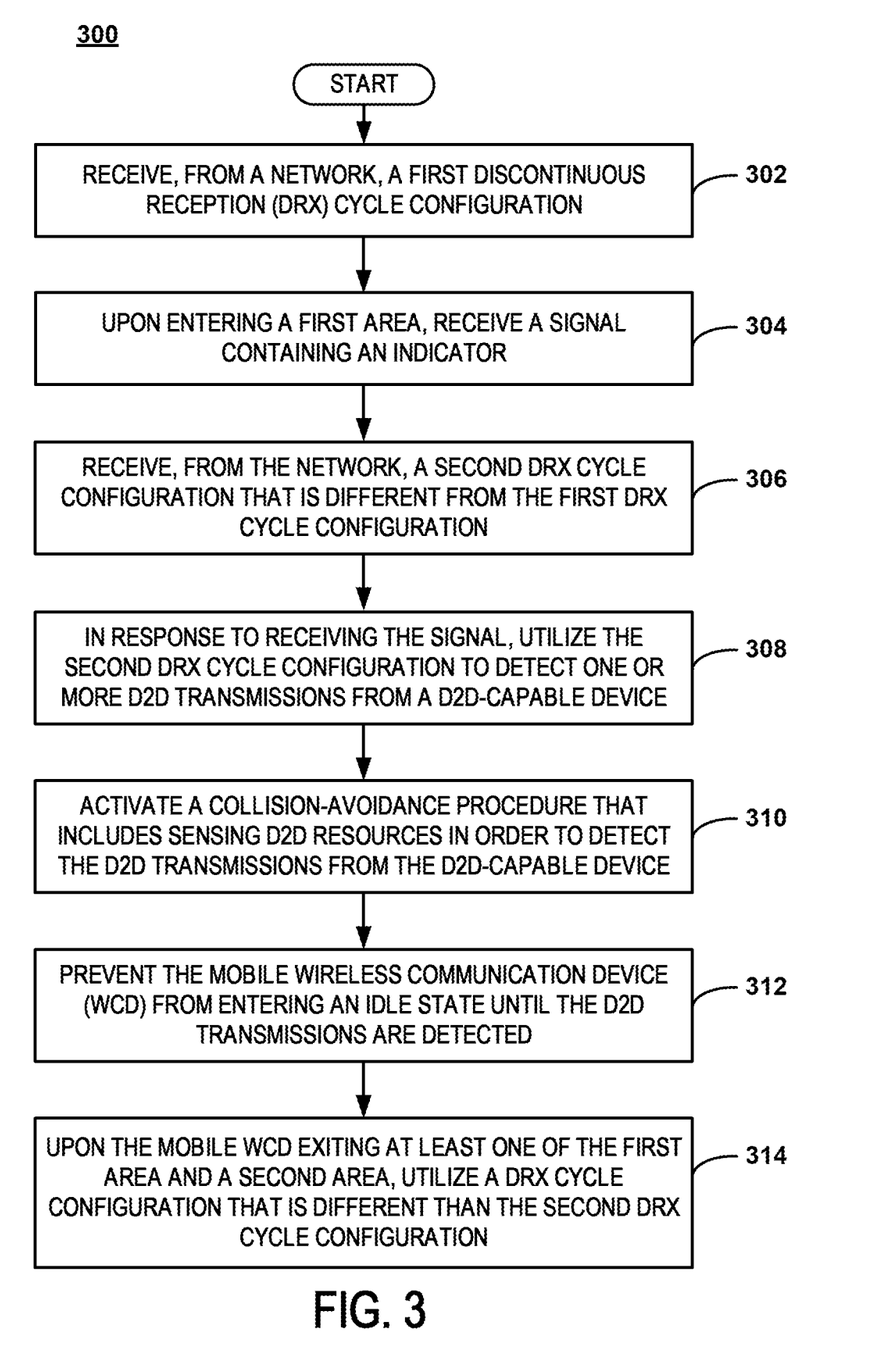
FIG. 3 is a flowchart of an example of a method of receiving a signal containing an indicator and, in response, obtaining and utilizing a second DRX cycle configuration, which is different than a first DRX cycle configuration, to detect one or more D2D transmissions from a D2D-capable device.

FIG. 3 is a flowchart of an example of a method of receiving a signal containing an indicator and, in response, obtaining and utilizing a second DRX cycle configuration, which is different than a first DRX cycle configuration, to detect one or more D2D transmissions from a D2D-capable device. The method 300 begins at step 302 with receiving, at mobile WCD 106 from a network, a first DRX cycle configuration. At step 304, mobile WCD 106 receives, upon entering first area 108, a signal containing an indicator. At step 306, mobile WCD 106 receives, from the network, a second DRX cycle configuration that is different from the first DRX cycle configuration. At step 308, WCD 106 utilizes the second DRX cycle configuration to detect one or more D2D transmissions from D2D-capable device 110. At step 310, WCD 106 activates a collision-avoidance procedure that includes sensing D2D resources in order to detect the D2D transmissions from D2D-capable device 110. At step 312, WCD 106 is prevented from entering an IDLE state until the D2D transmissions are detected. At step 314, WCD 106 utilizes, upon exiting at least one of first area 108 and second area 112, the WCD 106 will be configured with a DRX cycle configuration that is different than the second DRX cycle configuration. In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A mobile wireless communication device comprising:
   a receiver configured to:
      receive, from a network, a first discontinuous reception (DRX) cycle configuration,
      receive, upon entering a geographical area, a signal containing an indicator indicating a potential safety scenario related to the geographical area, and
      receive, from the network, a second DRX cycle configuration that is different from the first DRX cycle configuration; and
   a controller configured to utilize the first DRX cycle configuration while the mobile wireless communication device is outside of the geographical area and, in response to receiving the signal, utilize the second DRX cycle configuration to detect one or more device-to-device (D2D) transmissions from a D2D-capable device.

2. The mobile wireless communication device of claim 1, wherein the second DRX cycle configuration is a shorter DRX cycle configuration than the first DRX cycle configuration.

3. The mobile wireless communication device of claim 1, wherein the second DRX cycle configuration is compatible with a sidelink DRX cycle configuration of the D2D-capable device.

4. The mobile wireless communication device of claim 1, wherein the second DRX cycle configuration is selected from a plurality of user equipment (UE) specific DRX cycle configurations.

5. The mobile wireless communication device of claim 4, wherein the second DRX cycle configuration is a sidelink DRX configuration.

6. The mobile wireless communication device of claim 1, wherein the signal is part of a Synchronization Signal Block (SSB) transmission.

7. The mobile wireless communication device of claim 1, wherein the signal is a System Information Block (SIB) message.

8. The mobile wireless communication device of claim 1, wherein the signal is transmitted within a beam directed to the geographical area.

9. The mobile wireless communication device of claim 1, wherein the second DRX cycle configuration is received in a dedicated signal transmitted to the mobile wireless communication device.

10. The mobile wireless communication device of claim 1, wherein the controller is further configured to activate a collision-avoidance procedure that includes sensing device-to-device (D2D) resources in order to detect the D2D transmissions from the D2D-capable device and avoid a collision between the mobile wireless communication device and the D2D-capable device.

11. The mobile wireless communication device of claim 10, wherein the controller is further configured to prevent the mobile wireless communication device from entering an IDLE state until the D2D transmissions are detected.

12. The mobile wireless communication device of claim 1, wherein the controller is further configured to, upon exiting the geographical area, utilize a DRX cycle configuration that is different than the second DRX cycle configuration.

13. The mobile wireless communication device of claim 1, wherein the controller is further configured to utilize both the first DRX cycle configuration and the second DRX cycle configuration to detect the one or more D2D transmissions from the D2D-capable device.

14. A method performed at a mobile wireless communication device, the method comprising:

receiving, from a network, a first discontinuous reception (DRX) cycle configuration;

upon entering a geographical area, receiving a signal containing an indicator indicating a potential safety scenario related to the geographical area;

receiving, from the network, a second DRX cycle configuration that is different from the first DRX cycle configuration; and utilizing the first DRX cycle configuration while the mobile wireless communication device is outside of the geographical area and, in response to receiving the signal, utilizing the second DRX cycle configuration to detect one or more device-to-device (D2D) transmissions from a D2D-capable device.

15. The method of claim 14, wherein the second DRX cycle configuration is a shorter DRX cycle configuration than the first DRX cycle configuration.

16. The method of claim 14, wherein the second DRX cycle configuration is compatible with a sidelink DRX cycle configuration of the D2D-capable device.

17. The method of claim 14, wherein the second DRX cycle configuration is a sidelink DRX configuration.

18. The method of claim 14, wherein the signal is part of a Synchronization Signal Block (SSB) transmission.

19. A mobile wireless communication device comprising:
a receiver configured to:
receive, from a network, a first discontinuous reception (DRX) cycle configuration,
receive, upon entering a first geographical area, a signal containing an indicator indicating a potential safety scenario related to the geographical area, and
receive, from the network, a second DRX cycle configuration that is different from the first DRX cycle configuration;
a transmitter; and
a controller configured to utilize the first DRX cycle configuration while the mobile wireless communication device is outside of the geographical area and, in response to receiving the signal, utilize the second DRX cycle configuration to transmit, from the transmitter, a periodic device-to-device (D2D) safety message using D2D resources, the periodic D2D safety message comprising information for avoiding a collision.

20. The mobile wireless communication device of claim 1, wherein the potential safety scenario related to the geographical area comprises an increased potential for a collision between a pedestrian with the wireless communication device and vehicle with the D2D-capable device.

* * * * *